(12) United States Patent
Kuo

(10) Patent No.: US 9,632,536 B1
(45) Date of Patent: Apr. 25, 2017

(54) DOCK

(71) Applicant: GETAC TECHNOLOGY CORPORATION, Hsinchu County (TW)

(72) Inventor: Hsiu-Yu Kuo, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 15/231,675

(22) Filed: Aug. 8, 2016

(51) Int. Cl.
*G06F 1/16* (2006.01)
*H01R 13/62* (2006.01)
*H01R 13/631* (2006.01)

(52) U.S. Cl.
CPC .......... *G06F 1/1632* (2013.01); *H01R 13/62* (2013.01); *H01R 13/631* (2013.01)

(58) Field of Classification Search
CPC ...... H01R 13/62; H01R 13/631; G06F 1/1632
See application file for complete search history.

(56) References Cited

U.S. PATENT DOCUMENTS

| | | | | |
|---|---|---|---|---|
| 6,189,349 B1* | 2/2001 | Helot | ................. | E05B 73/0082 70/57 |
| 7,532,466 B2* | 5/2009 | Kobayashi | ........... | G06F 1/1632 361/679.41 |
| 8,824,135 B2* | 9/2014 | Tachibana | ............. | G06F 1/1632 345/169 |
| 9,170,609 B2* | 10/2015 | Yaojun | .................. | G06F 1/1632 |
| 9,575,511 B2* | 2/2017 | Yanagida | ............... | G06F 1/1632 |
| 2002/0181054 A1* | 12/2002 | Kaji | ....................... | G06F 1/1632 398/140 |
| 2010/0265652 A1* | 10/2010 | Agata | .................... | G06F 1/1632 361/679.41 |
| 2013/0335915 A1* | 12/2013 | Lai | ........................ | H01R 13/44 361/679.44 |
| 2016/0349793 A1* | 12/2016 | Tsukasaki | ............. | G06F 1/1632 |

* cited by examiner

*Primary Examiner* — James Harvey
*Assistant Examiner* — Oscar C Jimenez

(57) ABSTRACT

A dock includes a base, a pivot axis piece, a plate member, a connector and at least one elastic element. The base includes an upper case having a pressing hole and a connecting hole. The pivot axis piece is disposed on the upper case and the plate is pivotally connected to the upper case by the pivot axis piece. A first end of a main plate of the plate member has a pressing element and corresponding to the pressing hole. The connector is disposed at a second end of the main plate relative to the pressing element and corresponding to the connecting hole. The elastic element is connected between the upper case and the main plate. The elastic element makes the second end move away the upper case and lets the connector receive in the connecting hole.

11 Claims, 5 Drawing Sheets

DOCK

BACKGROUND OF THE INVENTION

Field of the Invention

The present invention relates to docks and, more particularly, to a dock for expanding a connectable hole/part of a portable electronic device, such as a notebook computer or a tablet.

Description of the Prior Art

To be downsized and conveniently carried, devices, such as tablets, are usually designed to be as thin as possible. To this end, the number of jacks on the device is minimized so that the thickness of the device can be reduced. Sometimes the device in operation requires a dock in order to be electrically connected with another device. The dock has an adapting connector mounted thereon so that a portable electronic device, such as a tablet, can output/input data or connect with another electronic device in order to operate.

A connector for use with a tablet is mounted on the dock. The connector allows a tablet to be electrically connected with another connector. The connector usually protrudes from the surface of a casing before use.

SUMMARY OF THE INVENTION

The aforesaid connector not only protrudes from the surface of a casing before use but also gets damaged as a result of a collision that happens during a storing or carrying process. In view of this, the present invention provides a dock characterized in that: before an electronic device is mounted on the dock, the connector is contained in a casing of the dock and thus prevented from getting damaged during a storing or carrying process.

The present invention in an embodiment provides a dock which comprises a base, a pivot element, a plate element, a connector, and at least one elastic component. The base comprises an upper casing and a lower casing. The upper casing and the lower casing are connected to form a receiving space. The upper casing has a pressing hole and a connecting hole. The pivot element is disposed at the upper casing and in the receiving space. The plate element is rotatably connected to the upper casing by the pivot element and disposed in the receiving space. The plate element comprises a main plate, a pressing portion, and at least one pivotal connection hole. The pressing portion is disposed at a first end of the main plate and corresponds in position to the pressing hole. At least one pivotal connection hole is disposed on the main plate and fitted around the pivot element. The connector is disposed at a second end of the main plate, opposite the pressing portion, and corresponds in position to the connecting hole, thereby allowing the pivot element to be disposed between the connector and the pressing portion. The at least one elastic component is disposed in the receiving space and positioned proximate to the connector. The at least one elastic component is abuttingly connected between the main plate and the upper casing to allow the main plate to rotate about the pivot element, keep the second end of the main plate away from the upper casing, and allow the pressing portion disposed at the first end of the main plate to penetrate the pressing hole and protrude from the upper casing.

Due to the seesaw structure disposed in the dock, the head of the connector is prevented from protruding from the upper surface of the upper casing before the electronic device is mounted on the dock. Hence, when the dock is not in use, the connector is prevented from getting damaged during a storing or carrying process.

In some embodiments, the upper casing further comprises at least one positioning hole, and the main plate further comprises at least one positioning post which penetrates the at least one positioning hole and protrudes from the upper casing. When an electronic device is mounted on the dock, the positioning posts perform an aligning function whereby the connector of the electronic device and the connector of the dock are aligned and electrically connected.

In some embodiments, the at least one elastic component is a spring fitted around each said positioning post. Fitting the at least one elastic component around the at least one positioning post dispenses with the need to provide any positioning structure for fixing the at least one elastic component in place, simplifies the structure of the dock, and reduces the steps of a related manufacturing process.

In some embodiments, when the pressing portion is subjected to an action force, the main plate rotates about the pivot element to keep the second end of the main plate close to the upper casing and protrude the connector from the upper casing. When the electronic device is mounted on the dock in order to operate, the electronic device presses against the pressing portion such that the main plate rotates about the pivot elements to cause the connector disposed at the second end of the main plate to penetrate the connecting hole and protrude from the upper casing; hence, the dock is electrically connected to the electronic device. Therefore, it is not necessary to spend extra time manipulating the dock; instead, the connector protrudes and gets connected to the electronic device as soon as the electronic device is mounted on the dock.

In some embodiments, the upper casing further comprises a hook protrudingly disposed below the pressing hole. To mount the electronic device in place, one end of the electronic device is engaged with the hook and then centrally positioned while the electronic device is being mounted on the dock, thereby rendering the mounting process easy and accurate.

In some embodiments, the pressing portion comprises a first board and a second board, with the first board being connected to the second board, and the second board being connected to the main plate, an included angle between the second board and the main plate is less than 90 degrees such that the pressing portion can be smoothly protruded and pressed to be stored in the base.

In some embodiments, the dock further comprises a fastening portion disposed at an end of the base to be opposite the pressing hole. When the electronic device is mounted on the dock, the electronic device is fastened and fixed to the dock with the fastening portion, thereby preventing the electronic device from separating from the dock while being moved or used.

In some embodiments, the fastening portion comprises two clutching portions disposed on two opposing sides of the upper casing, respectively, and on an upper surface of the upper casing. The clutching portions each comprise an engaging element which is engaged with the electronic device. Furthermore, the clutching portions are fixed to the base by screws.

In some embodiments, the fastening portion further comprises a freeing segment with two ends penetrating the base and being fastened to the clutching portions, respectively. Since the freeing segment connects with the two ends of the clutching portions, disengaging the clutching portions and releasing the electronic device entails pressing a single point rather than pressing the spaced-apart clutching portions with two hands simultaneously or separately. Furthermore, with the freeing segment being slender, the pressed area is maximized, and thus applying a force is easier.

In some embodiments, the fastening portion further comprises two resilient posts each penetratingly disposed at the base, with one end abutting against the freeing segment, and another end protruding from the upper casing. To remove the electronic device, the clutching portions are disengaged from the electronic device, and then the resilient posts generate a thrust away from the base to separate the electronic device from the dock, thereby making it easier to take out the electronic device.

In some embodiments, the resilient posts each comprise a protruding post and an elastic component, with the elastic component disposed in the receiving space and abutting against the protruding post. The protruding post abuts against the electronic device under a restoring force produced as a result of the compression of the elastic component.

DETAILED DESCRIPTION OF THE EMBODIMENTS

Figure 1:
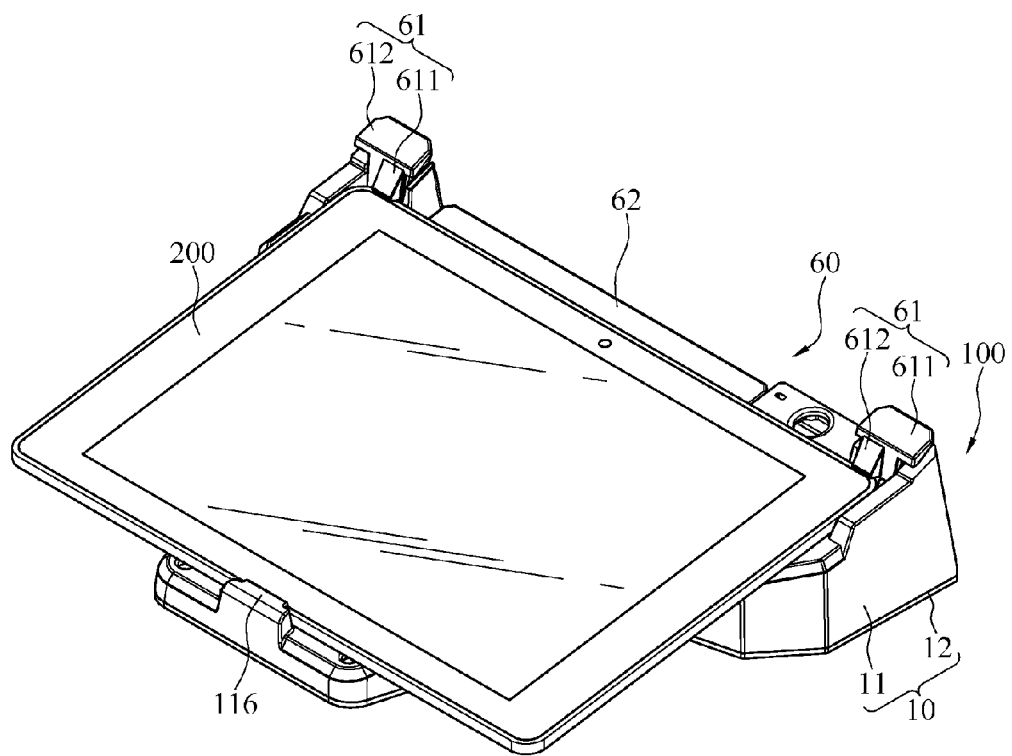
FIG. 1 is a perspective view of a dock with an electronic device mounted thereon according to the first embodiment of the present invention.
Figure 2:
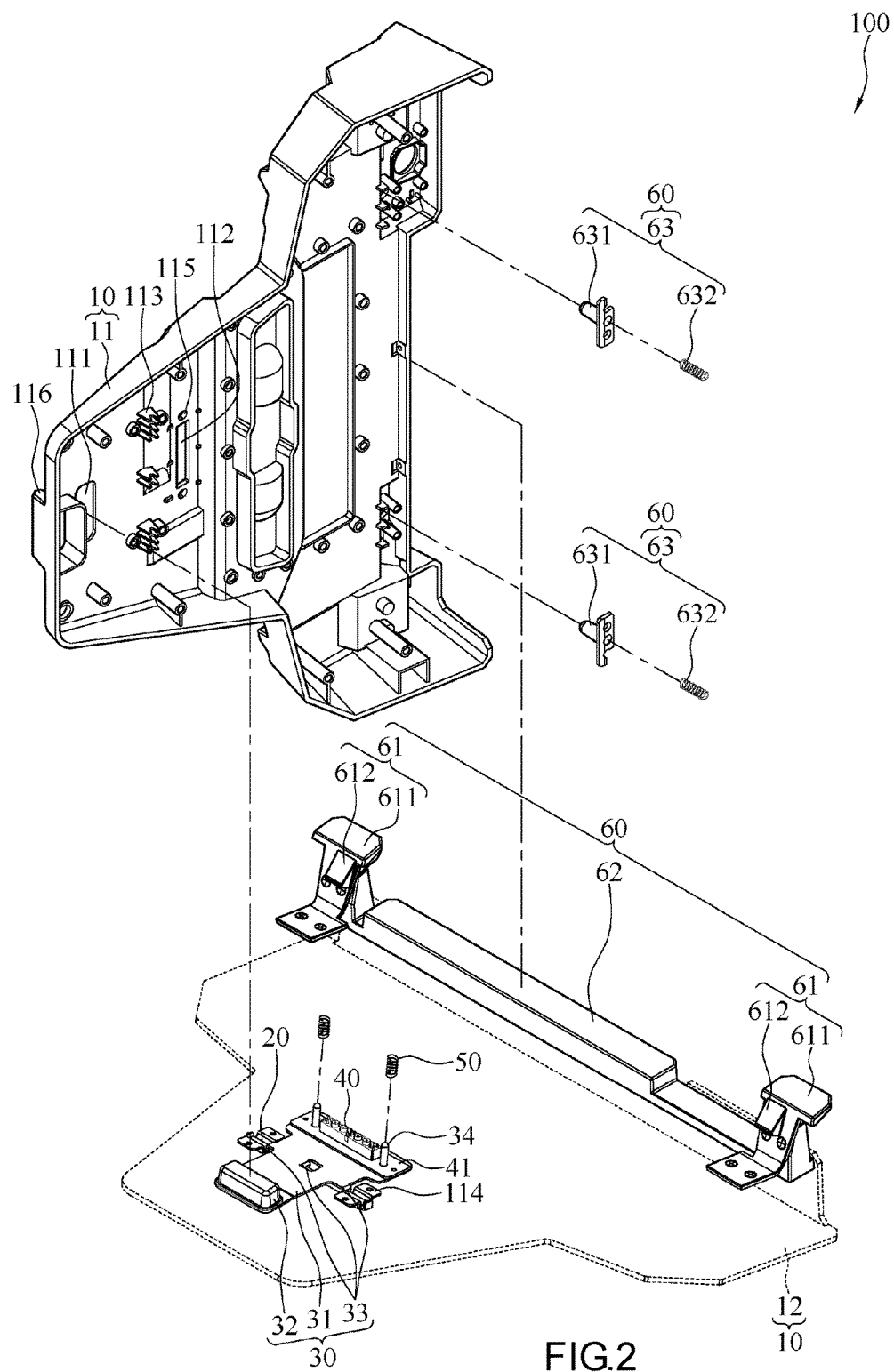
FIG. 2 is an exploded view of the dock according to the first embodiment of the present invention.
Figure 3:
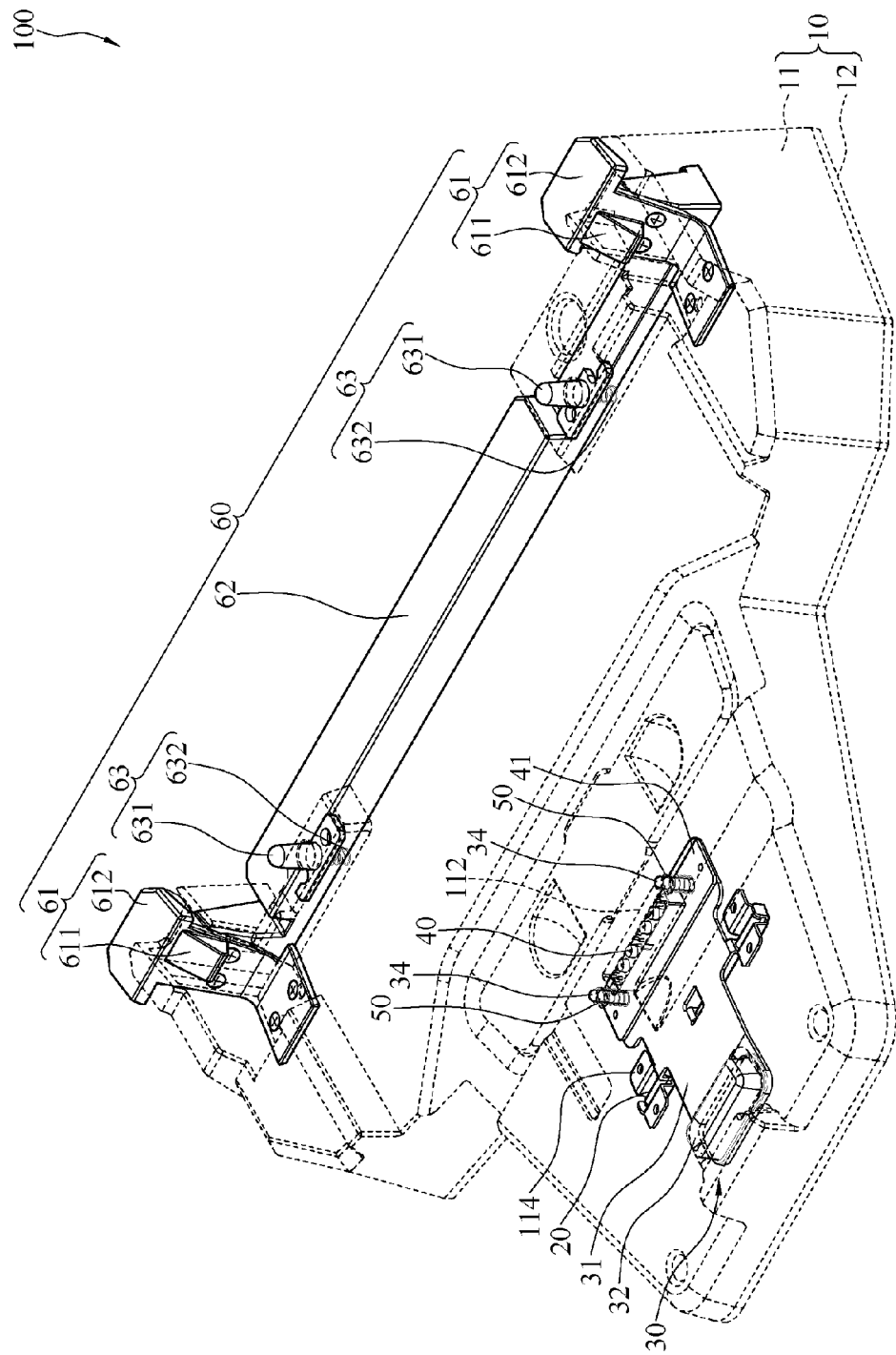
FIG. 3 is a see-through schematic view of an upper casing of the dock according to the first embodiment of the present invention.
Figure 4:
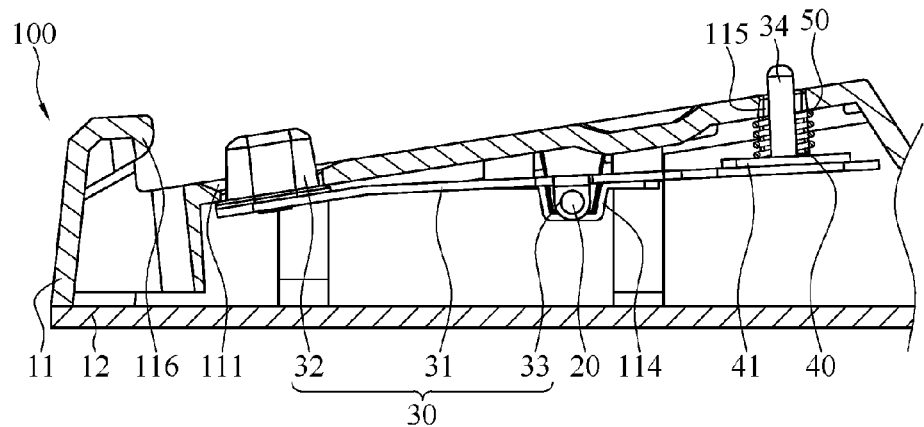
FIG. 4 is a cross-sectional view of the dock according to the first embodiment of the present invention.
Figure 5:
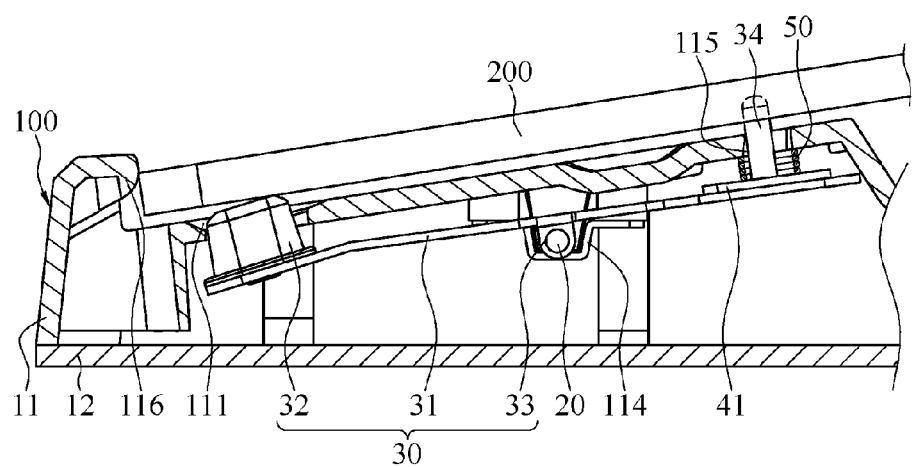
FIG. 5 is a cross-sectional view of the dock with the electronic device mounted thereon according to the first embodiment of the present invention.

Referring to FIG. 1 through FIG. 5 illustrate a dock in the first embodiment of the present invention. FIG. 1 is a perspective view of a dock with an electronic device mounted thereon according to the first embodiment of the present invention. FIG. 2 is an exploded view of the dock according to the first embodiment of the present invention. FIG. 3 is a see-through schematic view of an upper casing of the dock according to the first embodiment of the present invention. FIG. 4 is a cross-sectional view of the dock according to the first embodiment of the present invention. FIG. 5 is a cross-sectional view of the dock with the electronic device mounted thereon according to the first embodiment of the present invention. As shown in the diagrams, a dock 100 comprises a base 10, a pivot element 20, a plate element 30, a connector 40, two elastic components 50, and a fastening portion 60. The base 10 comprises an upper casing 11 and a lower casing 12. The upper casing 11 and the lower casing 12 are connected to form a receiving space 13 for receiving an electronic component, such as a circuit board (not shown). The upper casing 11 has a pressing hole 111 and a connecting hole 112. The shapes of the upper casing 11 and the lower casing 12 are subject to changes, depending on an electronic device 200 to be mounted on the dock 100.

Referring to FIG. 2 and FIG. 3, the pivot element 20 is disposed at the upper casing 11 and in the receiving space 13. Two pivotal connection holders 113 are disposed on the back of the upper casing 11 and each adapted to hold the pivot element 20. The pivot elements 20 are disposed on the pivotal connection holders 113, respectively. A stop element 114 is fastened to each pivotal connection holder 113 such that the pivot element 20 is fixed to the upper casing 11. The plate element 30 is rotatably connected to the upper casing 11 by the pivot element 20 and disposed in the receiving space 13. Referring to FIG. 2, the plate element 30 comprises a main plate 31, a pressing portion 32, and three pivotal connection holes 33. The pressing portion 32 is disposed at a first end of the main plate 31. The three pivotal connection holes 33 are substantially centrally disposed at the main plate 31 and uniformly distributed on the two sides and the middle of the main plate 31. The pivot elements 20 penetrate the pivotal connection holes 33 such that the main plate 31 rotates about the pivot elements 20. To stabilize the connection between the main plate 31 and the pivot element 20 and render the rotation of the main plate 31 smooth, one pivotal connection hole 33 is disposed on each of the two sides and the middle of the main plate 31. In a variant embodiment, only one or more pivotal connection holes 33 are provided, but the present invention is not limited thereto.

The connector 40 is disposed at a second end of the main plate 30 and opposite the pressing portion 32. The connector 40 is electrically connected to a circuit board 41. The circuit board 41 is positioned at any point in the base 10. Alternatively, in the first embodiment, the circuit board 41 is disposed below the connector 40 and fixed to the main plate 30. With the pivot element 20 being disposed between the connector 40 and the pressing portion 32, the main plate 20 rotates about the pivot element 20 in a seesawing pattern by using the pivot element 20 as a pivot. Specifically speaking, if the pressing portion 32 moves downward under a force, the connector 40 will move upward. If the connector 40 moves downward, the pressing portion 32 will move upward.

The two elastic components 50 are disposed in the receiving space and positioned proximate to the connector 40. The two ends of each of the two elastic components 50 abut against the main plate 30 and the upper casing 11, respectively, and provide a thrust for keeping the second end of the main plate 30 away from the upper casing 11. Referring to FIG. 3, the pressing portion 32 corresponds in position to the pressing hole 111 of the upper casing 11, whereas the connector 40 corresponds in position to the connecting hole 112 of the upper casing 11. When pushed under a thrust exerted by the elastic components 50, the main plate 30 rotates about the pivot elements 20 to keep the second end of the main plate 30 away from the upper casing 11. At this point in time, the pressing portion 32 disposed at the first end of the main plate 30 penetrates the pressing hole 111 and protrudes from the upper casing 11. Due to the thrust exerted by the elastic components 50, the connector 40 is received in the connecting hole 112 and thus does not protrude from the upper surface of the upper casing 11.

The seesaw structure disposed in the dock 100 prevents the head of the connector 40 from protruding from the upper surface of the upper casing 11 before the electronic device 200 is mounted on the dock 100. Hence, after the electronic device 200 has been mounted on the dock 100 and operating, the connector 40 is prevented from getting damaged during the storing and carrying process of the dock 100.

Referring to FIG. 4 and FIG. 5, when the pressing portion 32 is subjected to an action force, the main plate 30 rotates about the pivot elements 20 to keep the second end of the main plate 30 close to the upper casing 11 and protrude the connector 40 from the upper casing. For instance, mounting the electronic device 200 (shown in FIG. 1) on the dock 100 entails the following steps: the back of the electronic device 200 presses against the pressing portion 32 protruding from the upper casing 11 such that the electronic device 200 exerts an action force on the pressing portion 32 while it is mounted; when the pressing portion 32 moves under the action force, the main plate 30 rotates about the pivot elements 20 by using the pivot elements 20 as the pivots to cause the second end of the main plate 30 to move upward and cause the connector 40 to penetrate the connecting hole 112 and protrude from the upper casing 11 such that the connector 40 and a connector (not shown) on the back of the electronic device 200 are electrically connected to each other. Therefore, it is not necessary to spend extra time protruding the connector 40 otherwise hidden in the base 10 out of the base 10 in order to access the dock 100; instead, the connector 40 protrudes and gets connected to the electronic device 200 as soon as the electronic device 200 is mounted on the dock 100.

Referring to FIG. 2 and FIG. 3, the upper casing 11 further comprises two positioning holes 115. The main plate 30 further comprises two positioning posts 34. Referring to FIG. 3, the two positioning posts 34 each penetrate a positioning hole 115 and protrude from the upper casing 11. When the electronic device 200 is mounted on the dock 100, the positioning posts 34 perform an aligning function whereby the connector of the electronic device 200 and the connector 40 of the dock 100 are aligned and electrically connected. Since the positioning posts 34 serve to position the connector of the electronic device 200 and the connector 40 of the dock 100 as appropriate, the positioning posts 34 flank the connector 40 and thus perform the positioning function better. In this embodiment, in addition to the positioning function, the two elastic components 50 are springs fitted around the two positioning posts 34, respectively. Fitting the two elastic components 50 around the two positioning posts 34 dispenses with the need to provide any positioning structure for fixing the elastic components 50 in place, simplifies the structure of the dock 100, and reduces the steps of a related manufacturing process.

To render it easy to mount the electronic device 200 on the dock 100, the upper casing 11 further comprises a hook 116 protrudingly disposed below the pressing hole 111. To mount the electronic device 200 in place, one end of the electronic device 200 is engaged with the hook 116 and then centrally positioned while the electronic device 200 is being mounted on the dock 100, thereby rendering the mounting process easy and accurate. After the electronic device 200 is placed at the base 10, the electronic device 200 is fastened in place by the fastening portion 60.

Referring to FIG. 1 through FIG. 3, the fastening portion 60 is disposed at one end of the base 10 to be opposite the pressing hole 111. When the electronic device 200 is mounted on the dock 100, the electronic device 200 is fastened and fixed to the dock 100 with the hook 116 at one end and the fastening portion 60 at the other end, thereby preventing the electronic device 200 from separating from the dock 100 while being moved or used. In this embodiment, the fastening portion 60 comprises two clutching portions 61 and a freeing segment 62. The two clutching portions 61 are disposed on two opposing sides of the upper casing 11, respectively, and on the upper surface of the upper casing 11, and are fixed to the upper casing 11 by screws. The clutching portions 61 each comprise an engaging element 611 and a releasing portion 612. The engaging element 611 is engaged with the electronic device 200. The engaging element 611 is pressed to disengage the releasing portion such that the engaging element 611 separates from the electronic device 200 and gets disengaged from the electronic device 200.

The freeing segment 62 is slender and disposed on one side of the base 10. The two ends of the freeing segment 62 penetrate the base 10 and get fastened to the clutching portions 61, respectively. Since the freeing segment 62 connects with the two ends of the clutching portions 61, disengaging the clutching portions 61 and releasing the electronic device 200 entails pressing a single point (i.e., the freeing segment 62) rather than pressing the spaced-apart clutching portions 61 with two hands simultaneously or separately. Furthermore, with the freeing segment 62 being slender, the pressed area is maximized, and thus applying a force is easier.

The fastening portion 60 further comprises two resilient posts 63. Each resilient post 63 is penetratingly disposed at the base 10, with one end abutting against the freeing segment 62, and the other end protruding from the upper casing 11. Referring to FIG. 2 and FIG. 3, in this embodiment, the resilient posts 63 each comprise a protruding post 631 and an elastic component 632. The protruding post 631 penetrates the base 10 and protrudes from the upper casing 11. The elastic component 632 is disposed in the receiving space 13 and abuts against the protruding post 631 to provide an action force under which the protruding post 631 under linear reciprocating motion. When the electronic device 200 is mounted on the dock 100, it presses against the protruding posts 631, and thus the protruding posts 631 push and compress the elastic components 632. To remove the electronic device 200, the clutching portions 61 are disengaged from the electronic device 200, and then, under a restoring force produced as a result of the compression of the elastic components 632, the protruding posts 631 of the resilient post 63 generate a thrust away from the base 10 to separate the electronic device 200 from the dock 100, thereby making it easier to take out the electronic device 200.

Figure 6:
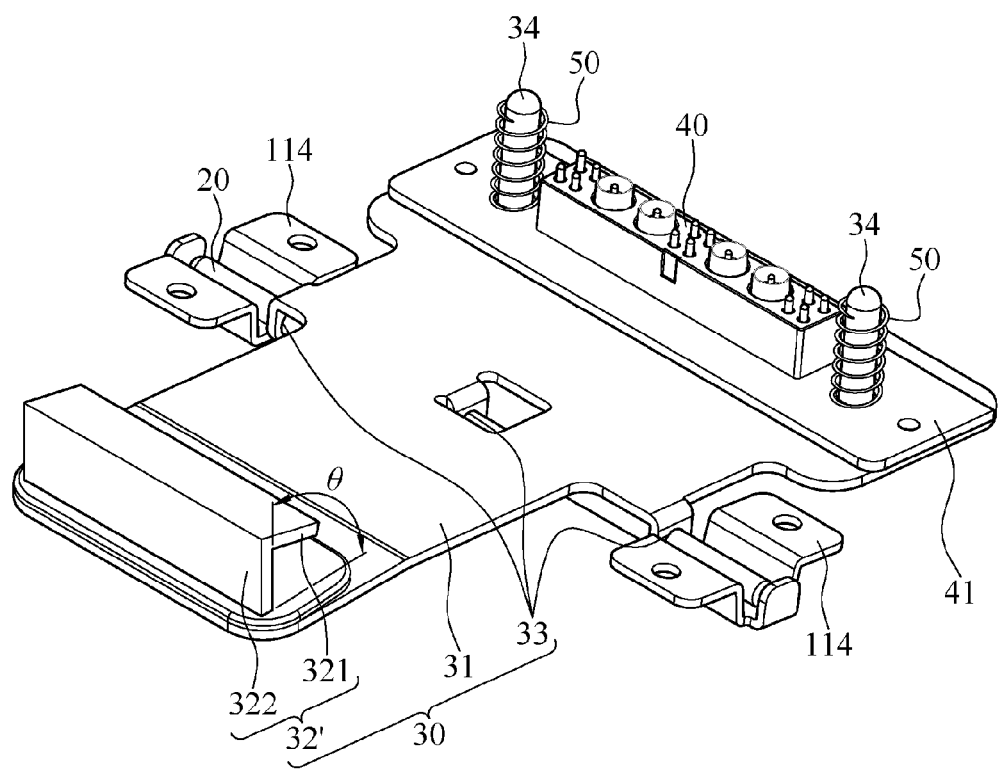
FIG. 6 is a schematic view of a main plate of the dock according to the second embodiment of the present invention.

Referring to FIG. 6, there is shown a schematic view of the main plate of the dock according to the second embodiment of the present invention. Identical components with specific connection relationships in the first and second embodiments are denoted with identical reference numerals, and thus these components in the second embodiment are not described for the sake of brevity. A pressing portion 32' of the main plate 30 in the second embodiment distinguishes the second embodiment from the first embodiment. In the second embodiment, the pressing portion 32' comprises a first board 321 and a second board 322. With the first board 321 being connected to the second board 322, and the second board 322 being connected to the main plate 30, the pressing portion 32' is substantially L-shaped. The included angle θ between the second board 322 and the main plate 30 is less than 90 degrees such that the pressing portion 32' can be smoothly protruded and pressed to be stored in the base 10.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A dock, comprising:
   a base comprising an upper casing and a lower casing, with a receiving space formed by connecting the upper casing and the lower casing, the upper casing having a pressing hole and a connecting hole;
   a pivot element disposed at the upper casing and in the receiving space;
   a plate element rotatably connected to the upper casing by the pivot element and disposed in the receiving space, the plate element comprising a main plate, a pressing portion, and at least one pivotal connection hole, wherein the pressing portion corresponding in position to the pressing hole is disposed at a first end of the main plate, with the at least one pivotal connection hole disposed on the main plate and fitted around the pivot element;
   a connector disposed at a second end of the main plate to therefore be opposite the pressing portion and correspond in position to the connecting hole such that the pivot element is disposed between the connector and the pressing portion; and
   at least one elastic component disposed in the receiving space, positioned proximate to the connector, and adapted to abut against the main plate and the upper casing, wherein the main plate rotates about the pivot element to keep the second end of the main plate away from the upper casing and allow the pressing portion disposed at the first end of the main plate to penetrate the pressing hole and protrude from the upper casing.

2. The dock of claim 1, wherein the upper casing further comprises at least one positioning hole, and the main plate further comprises at least one positioning post which penetrates the at least one positioning hole and protrudes from the upper casing.

3. The dock of claim 2, wherein the elastic component is a spring fitted around each said positioning post.

4. The dock of claim 1, wherein, when the pressing portion is subjected to an action force, the main plate rotates about the pivot element to keep the second end of the main plate close to the upper casing and protrude the connector from the upper casing.

5. The dock of claim 1, wherein the upper casing further comprises a hook protrudingly disposed below the pressing hole.

6. The dock of claim 1, wherein the pressing portion comprises a first board and a second board, with the first board being connected to the second board, and the second board being connected to the main plate, an included angle between the second board and the main plate is less than 90 degrees.

7. The dock of claim 1, further comprising a fastening portion disposed at an end of the base to be opposite the pressing hole.

8. The dock of claim 7, wherein the fastening portion comprises two clutching portions disposed on two opposing sides of the upper casing, respectively, and on an upper surface of the upper casing.

9. The dock of claim 8, wherein the fastening portion further comprises a freeing segment with two ends penetrating the base and being fastened to the clutching portions, respectively.

10. The dock of claim 9, wherein the fastening portion further comprises two resilient posts each penetratingly disposed at the base, with one end abutting against the freeing segment, and another end protruding from the upper casing.

11. The dock of claim 10, wherein the resilient posts each comprise a protruding post and an elastic component, with the elastic component disposed in the receiving space and abutting against the protruding post.

* * * * *